Figure 1:
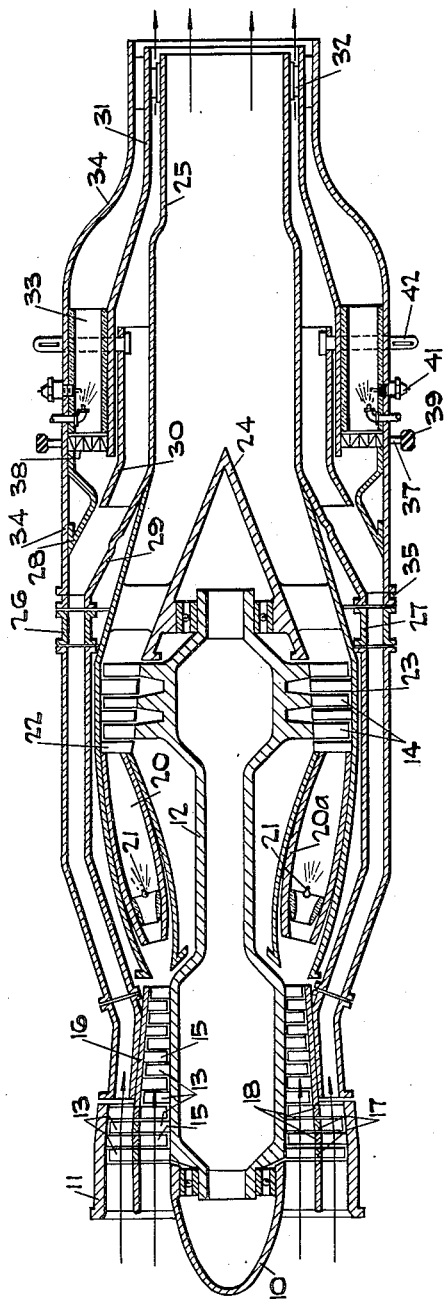

April 21, 1953        F. JONKER        2,635,420

JET PROPULSION ENGINE WITH AUXILIARY PULSE JET ENGINE

Filed May 10, 1948        2 SHEETS—SHEET 1

Inventor:
Frits Jonker
By Oswald H. Milmore
His Attorney

April 21, 1953  F. JONKER  2,635,420
JET PROPULSION ENGINE WITH AUXILIARY PULSE JET ENGINE
Filed May 10, 1948  2 SHEETS—SHEET 2

Inventor:
Frits Jonker
By Oswald N. Milmore
His Attorney

Patented Apr. 21, 1953

2,635,420

UNITED STATES PATENT OFFICE 2,635,420

JET PROPULSION ENGINE WITH AUXILIARY PULSE JET ENGINE

Frits Jonker, Delft, Netherlands, assignor to Shell Development Company, San Francisco, Calif., a corporation of Delaware Application May 10, 1948, Serial No. 26,164
In the Netherlands May 14, 1947

6 Claims. (Cl. 60—35.6)

This invention relates to internal-combustion engine, jet-propulsion units, and is concerned with an improved method of operation to increase the thrust thereof temporarily and particularly with a jet-propulsion unit suitable for carrying out the method.

During the start and during the short space of time after the take-off, an aeroplane requires a greater propulsive force than during horizontal flight at normal speed. However, the propulsive force of jet engines is substantially independent of the speed of flight; moreover, a jet engine cannot, in practice, be overloaded. If, therefore, the jet engine is to gain a place in civil aviation, it will be necessary to devise means for sufficiently increasing the propulsive force of the engine during temporary periods, e. g., during take-off.

There are certain types of jet engines in which part of the turbine power is used to drive a separate or auxiliary compressor. The auxiliary air stream delivered by this auxiliary compressor does not take part in the combustion during normal operation, but is discharged to augment the jet of combustion products, either together with such products or through a separate jet pipe. Now it is already known to cause fuel combustion to take place also in this auxiliary air stream during the take-off, to produce a constant-pressure reaction jet; however, the effect of this expedient has been found to be unsatisfactory.

It is the primary object of this invention to provide an improved method of temporarily increasing the thrust of internal-combustion, jet propulsion engines of the constant-pressure type, and to provide a jet-propulsion unit suitable for practicing such a method. The invention is particularly adapted to, and will be disclosed as applied to a turbine type propulsion unit, but may be applied to other constant-pressure jet engines, e. g., a ram-jet.

A further object is to provide a jet-propulsion unit of the type described wherein an auxiliary pulse-jet engine unit, sometimes known as an explosion-reaction, jet propulsion engine, is operated temporarily during periods that additional thrust is desired, and wherein no additional compressor or air-admission equipment is required for the operation of the auxiliary engine. Ancillary thereto, it is an object to provide an improved method and apparatus whereby a more or less constant augmentation thrust, augmenting the thrust of the primary, constant pressure jet, is provided by a pulse-jet engine.

According to the present invention, the temporary increase of the propulsive thrust is brought about not by a continuous, but by a discontinuous combustion system, i. e., by one or more pulse-jet engines, provided with auxiliary jet means. Such auxiliary jet means may be simply a passageway discharging the gases from the pulse-jet engine or engines into the main, constant-pressure jet pipe; preferably, I provide one or more separate expansion nozzles for the auxiliary engine. The reaction force generated by a sustained series of explosions according to the invention provides the added propulsive force, which is greater for a given mass of air than would be attained were a like quantity of fuel burned continuously in air at a given supply pressure. This increase in thrust may be explained as follows: The discharge velocity of the combustion products is limited by the pressure at which combustion occurs, and this cannot exceed the given supply pressure in the case of continuous combustion. However, when the air is admitted into a combustion chamber of the pulse-jet type, the pressure is increased considerably during the explosion, permitting increased discharge velocity and, consequently, increased thrust.

The invention is capable of embodiment in a great variety of forms, as will be apparent to those skilled in the art. For purposes of illustrating one preferred embodiment of the invention, it will be described in a form wherein use is made of the very simplest type of pulse-jet or explosion-reaction engine, viz., the type used for propelling the V-1 German retaliation weapon, which engine is also known as the Reed engine or Argus engine. For obtaining thrust which is coaxial with the primary, constant-pressure jet, it is preferred to mount a battery of independent combustion chambers, each provided with a source of fuel and with valves, and operating as independent engines, annularly about the main jet pipe. By means of a slide valve it is possible to shut off the flow of air into these combustion chambers during normal operation, and to feed it into such chambers during temporary periods.

Air for the auxiliary pulse-jet engine may be obtained directly from the air admission means of the primary, constant-pressure engine, e. g., from its air scoop or from its compressor, which may, if desired, be provided with separate blading for delivering an auxiliary air stream which does not flow through the combustion chamber of the primary engine; or all air may be passed through the combustion chamber and the turbine of the primary engine, combustion being effected with an excess of air to produce oxygen-containing combustion products, a portion of which are temporarily fed into the auxiliary, pulse-jet engine. In the former case, the auxiliary air stream is, during normal operation (when the auxiliary engine is out of operation), discharged to augment the thrust, either commingled with the combustion products, or as a separate, e. g., annular, jet. In the latter case, it is desirable to burn added fuel in the portion of the combustion products which is not diverted into the auxiliary engine, to compensate for the volume drawn off, since otherwise the flow of gas from the main jet pipe yields little, if any, propulsive force. In view of this requirement the second arrangement, (although within the purview of the invention) is not so readily utilized and will not be described in detail in connection with the drawings.

Figure 4:
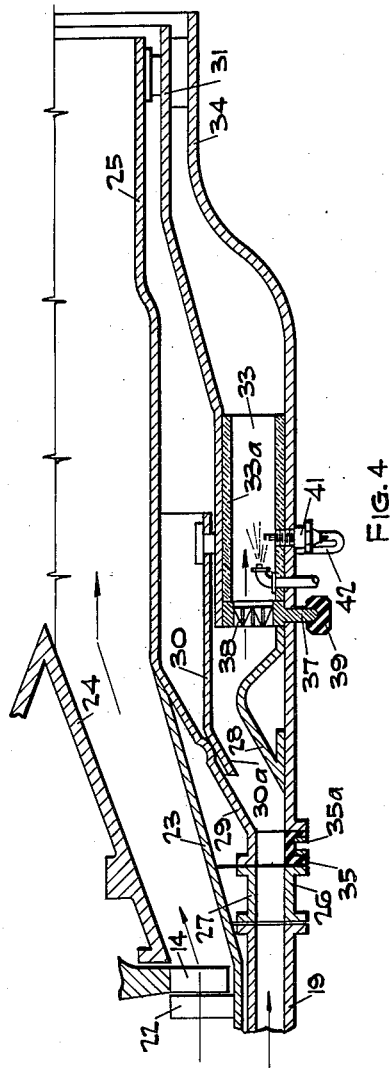
Figure 3:
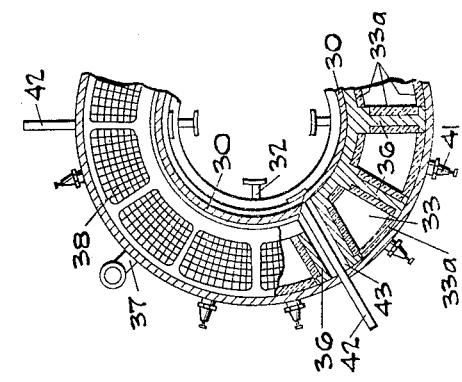
Figure 5:
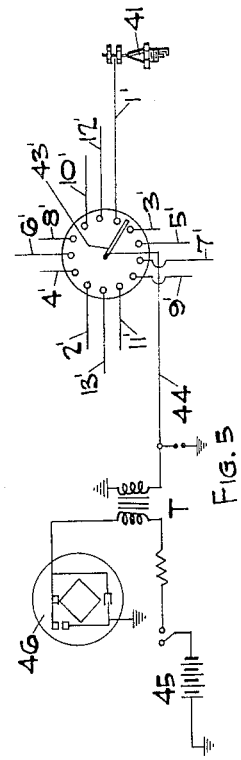
Figure 2:
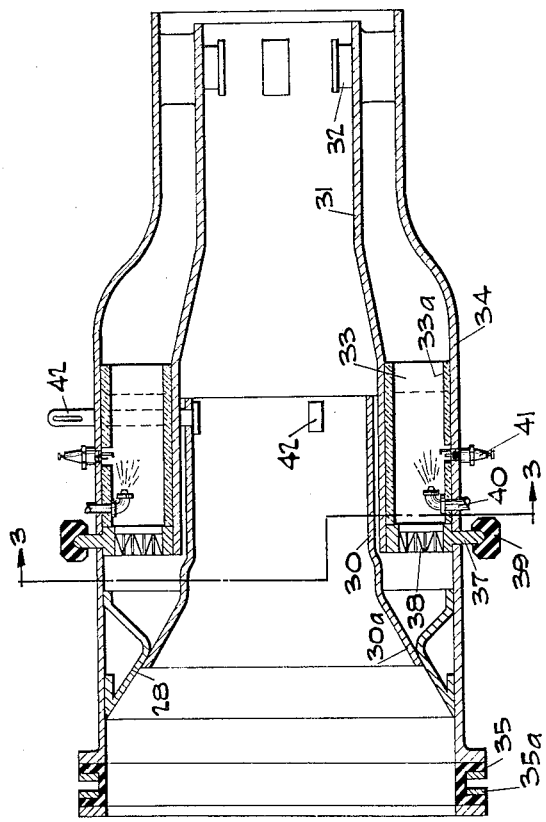

In the drawings forming a part of this specification, Fig. 1 is a longitudinal sectional view of a jet-propulsion unit according to the invention; Fig. 2 is an enlarged longitudinal sectional view of the auxiliary engine; Fig. 3 is a sectional view taken on line 3—3 of Fig. 2; Fig. 4 is a fragmentary, longitudinal sectional view showing the slide valve positioned to admit air into the auxiliary engine; and Fig. 5 is a circuit diagram of an ignition system suitable for use in the pulse-jet unit.

Referring to the drawing, the primary, constant-pressure engine has a stationary nose 10 carrying a stationary shell 11 and forming, between them, an annular air intake. A rotor 12 is mounted in bearings and carries movable compressor blades 13 at its forward end, and movable turbine blades 14 at its rear end. The compressor has stationary blades 15, fixed to a stationary shell 16, and provides a plurality of compression stages. The movable blades and stationary or guiding blades on the first two pressure stages are radially elongated, and preferably provided with annular tubular partitions 17 and 18, respectively, to provide concentric, annular air streams, the first, radially inner stream flowing within the partitions 17 and 18 and the shell 16, and the second or auxiliary, radially outer stream flowing outside of the partitions 17 and 18 and within the shell 11, and being discharged through a plurality of pipes 19 arrange about the shell 16. The partition 18 in the second elongated stationary blades may be formed integrally with the shell 16, as shown. The first air stream passes through an annular series of combustion chambers 20 having walls 20a wherein it is mixed with fuel admitted continuously through nozzles 21. Combustion may be initiated or maintained by any conventional means (not shown) such as a pilot flame or a spark. Combustion gases pass through the turbine blading, comprising the movable blades 14 and stationary blades 22 carried on the inner wall of a shell 23, which has a streamlined nose 24. The combustion products are then expanded and discharged rearwardly through primary jet pipe 25, to form the primary jet.

The auxiliary air stream from pipes 19 flows into an annular channel between concentric shells 26 and 27, supported on the shell 23. From there it enters a convergent section between frusto-conical shells 28 and 29. Flow out of this section is selectively controlled by a slide valve 30, described hereafter. During normal operation the valve is positioned as shown in Figs. 1 and 2, and the air is discharged rearwardly to augment the thrust of the primary jet; in the specific embodiment shown, it is discharged as an independent, annular stream through a jet pipe 31 and outside of the pipe 25. The pipe 31 is connected to the pipe 25 by radial vanes 32.

The auxiliary, pulse-jet or explosion-reaction jet engine comprises a plurality, e. g., thirteen, combustion chambers 33 bounded by walls 33a of heat resistant material and arranged annularly about the pipe 31, and within an outer, stationary shell 34, connected at its forward end to the shell 26 through rubber mounting 35 having retaining rings 35a. Radial partitions 36 separate the adjoining combustion chambers, which are open at the rear and in communication with the rear, convergent part of shell 34 which forms an auxiliary jet pipe. They are provided at the front with a check valve structure providing valves of the type known as pulse jet valves; this structure comprises an annular frame 37 carrying a large number of vanes or flaps 38 which will close when the pressure within the combustion chambers rises due to an explosion, and which will open when the pressure is lowered. These valves may be fabricated from an annular, unitary piece by stamping, although any type of non-return valve may be used. The ring or frame 37 may be supported externally at one or more places by rubber connectors 39. These and the rubber connectors 35 isolate the primary engine from vibrations generated by the pulse-jet engine. Fuel nozzles 40 are provided to admit fuel either continuously or intermittently into the chambers, and spark plugs 41 are provided to initiate or sustain repeated explosions. Various forms of pulse-jet engines may be used, and I do not limit myself to any specific type. Thus, some types require a spark only for the initial explosion, and subsequent explosions result from the hot gases remaining in the combustion chamber from the previous charge; in others the spark initiates each successive explosion.

I may arrange the auxiliary engine to fire the several combustion chambers in sequence, for example, in the order of ignition used in radial piston engines. This may be effected by initiating the combustion by proper timing of the spark. In cases where the subsequent explosions are dependent upon the spark, such spark timing is maintained during the operation of the auxiliary engine by well known means. When the explosions are self-sustaining the firing order, once initiated, may be sustained by constructing the several combustion chambers to continue operation at the same frequency. The spark plugs may, for example, be connected to a circuit of the type shown in Fig. 5, wherein numbers 1'–13', inclusive, denote the wires connected to the spark plugs, the numbers denoting the order of the corresponding combustion chamber numbered consecutively to give a conventional firing order 1—3—5—7—9—11—13—2—4—6—8—10—12. These wires are connected to corresponding contacts swept by a rotating distributing contact arm 43 that is connected by a wire 44 to the secondary winding of a transformer T. The primary winding is supplied with electric power from a source 45 controlled by breaker points 46.

Combustion air is supplied to the pulse-jet engine from the pipes 19 and the annular channels between sections 26 and 28 by moving the slide valve 30 to its forward position as shown in Fig. 4. This valve is frusto-conical at its forward end 30a and is mounted with its rear, cylindrical portion in sliding engagement within pipe 31. It has several radial control rods 42 extending radially through slots 43 between combustion chambers (see Fig. 3). When the valve 30 is in its rearward position, shown in Fig. 1, the conical end 30a engages section 28 and all of the auxiliary air is directed into the jet pipe 31. When the valve is moved to the front as shown in Fig. 4, the conical end engages section 29 and the auxiliary air is deflected outwardly against the valves 38 to enter the pulse-jet engine.

I claim as my invention:

1. In an internal-combustion turbine, jet-propulsion unit, the combination of a primary, substantially constant-pressure jet engine comprising air admission means having an air compressor, said compressor having first and second sets of blades for compressing first and second air streams, a source of fuel for effecting combustion in said first air stream, a turbine arranged to be driven by combustion products from said first air stream and connected for driving said compressor, primary jet means for said combustion products, and auxiliary discharge means for discharging said second air stream to augment said primary jet, with an auxiliary, pulse-jet engine comprising one or more combustion chambers provided with pulse-jet valves, sources of fuel, auxiliary jet means therefor, and flow control means for selectively feeding air from said second air stream into said auxiliary combustion chambers or to said auxiliary discharge means.

2. The jet-propulsion unit according to claim 1 wherein the means for discharging said second air stream comprises a duct for discharging said stream as an annular stream about and separately from said primary jet means.

3. In an internal-combustion turbine, jet-propulsion unit, the combination of a primary, substantially constant-pressure jet engine comprising air admission means having an air compressor, said compressor having a high-pressure outlet and a low pressure outlet for discharging high and low pressure air streams, a source of fuel for effecting combustion in said high pressure air stream, a turbine arranged to be driven by combustion products from said high pressure air stream and connected for driving said compressor, and auxiliary discharge means for discharging said low pressure air stream to augment said primary jet, with an auxiliary, pulse-jet engine comprising one or more combustion chambers provided with pulse-jet valves, sources of fuel, auxiliary jet means therefor, and flow control means for selectively feeding air from said second air stream into said auxiliary combustion chambers or to said auxiliary discharge means.

4. The jet-propulsion unit according to claim 3 wherein the auxiliary, pulse-jet engine comprises a plurality of combustion chambers arranged annularly about the primary, constant-pressure jet engine.

5. The jet-propulsion unit according to claim 4 wherein the combustion chambers of the auxiliary, pulse-jet engine are arranged to be fired in sequence.

6. In an internal-combustion turbine, jet-propulsion unit, the combination of a primary, substantially constant-pressure jet engine comprising air admission means having an air compressor, said compressor being provided with separate high pressure outlets for discharging a radially inward, first air stream, and a radially outward, second air stream, a source of fuel for effecting combustion in said first air stream, a turbine arranged to be driven by combustion products from said first air stream and connected for driving said compressor, primary jet means for said combustion products, and means for discharging said second air stream to augment said primary jet, with an auxiliary, pulse-jet engine comprising a plurality of combustion chambers provided with sources of fuel arranged annularly about said primary jet engine, auxiliary jet means therefor, and an annular, frusto-conical slide valve for selectively feeding air from said second air stream into said auxiliary combustion chambers.

FRITS JONKER.

References Cited in the file of this patent

UNITED STATES PATENTS

| Number | Name | Date |
|---|---|---|
| 1,983,405 | Schmidt | Dec. 4, 1934 |
| 2,409,177 | Allen et al | Oct. 15, 1946 |
| 2,430,399 | Heppner | Nov. 4, 1947 |
| 2,435,836 | Johnson | Feb. 10, 1948 |
| 2,458,600 | Imbert et al. | Jan. 11, 1949 |
| 2,464,724 | Sédille | Mar. 15, 1949 |
| 2,503,006 | Stalker | Apr. 4, 1950 |
| 2,505,757 | Dunbar et al. | May 2, 1950 |

FOREIGN PATENTS

| Number | Country | Date |
|---|---|---|
| 188,642 | Great Britain | Nov. 29, 1923 |
| 586,572 | Great Britain | Mar. 24, 1947 |
| 919,127 | France | Nov. 18, 1946 |